Nov. 29, 1966 A. LINTON 3,288,651
ELECTRIC CELLS
Filed Sept. 17, 1963
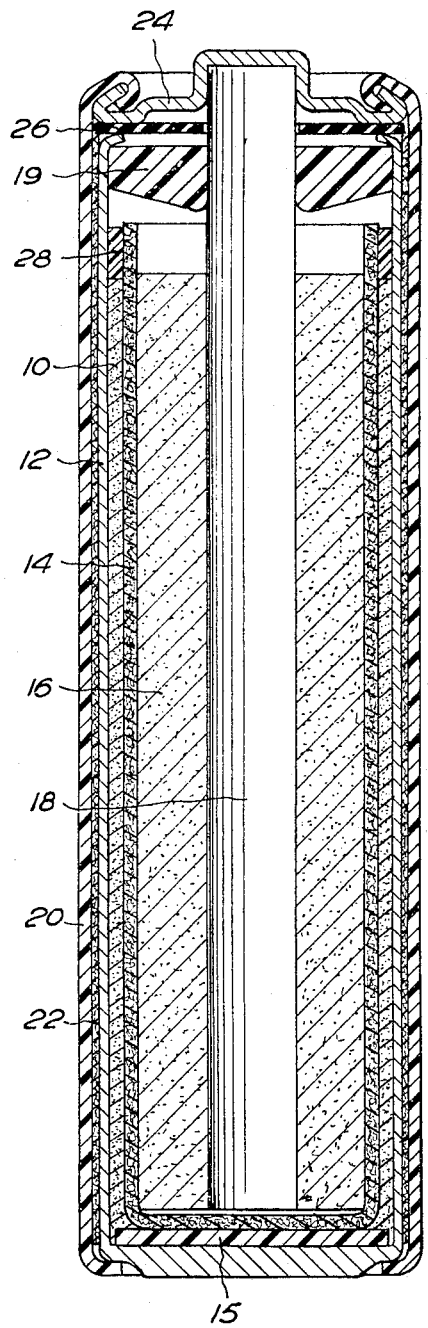
Inventor
Alfred Linton
By G. H. Piney Atty.

3,288,651
ELECTRIC CELLS
Alfred Linton, 10 Sherbrook St., Dundee, Angus, Scotland
Filed Sept. 17, 1963, Ser. No. 309,572
Claims priority, application Great Britain, Sept. 20, 1962, 35,915/62
7 Claims. (Cl. 136—107)

The invention relates to electric cells having anodes of zinc, with manganese peroxide depolarizer and an alkaline electrolyte, usually potassium hydroxide.

Cells with alkaline electrolyte possess a number of advantages over the much more familiar Leclanché cells having the same electrode system but an ammonium chloride electrolyte. One advantage is a much longer life on continuous discharge and at relatively high rate coupled with a steadier working voltage and sharper cutoff. Another is that the cells can be constructed as rechargeable cells although there is a limit to the number of cycles through which such cells can be taken.

Hitherto zinc/manganese dioxide alkaline cells have been made with the cathode and depolarizer surrounding the anode. The tubular body of depolarizer has usually been enclosed in a steel cathode can and the anodes have typically taken the form of a pressed powder zinc tube. This construction has been followed despite the obvious disadvantage that the polarity of the can is the reverse of that of the familiar Leclanché cell so that construction is complicated if the superior alkaline cell is to be substituted directly for the former in an application where polarity is significant.

In accordance with the invention a cell having zinc anode, manganese peroxide depolarizer and alkaline electrolyte is constructed with an annular anode, preferably of amalgamated zinc granules, surrounding the depolarizer and the cathode.

The invention can be applied to the construction of a rechargeable cell having an anode of powdered zinc. The cell can conveniently be housed in a steel can internally coated with inert plastics material and electrically connected to the anode so as to serve in conventional manner as the negative terminal. Such a can may be sealed by a plastics material washer through which the carbon rod cathode projects.

The application of the invention to the construction of a primary cell will be described in some detail, by way of example, with reference to the accompanying drawing, which is a vertical section through the cell.

The cell shown in the drawing comprises an anode 10 of amalgamated zinc granules within a negative terminal zinc can 12, a paper separator tube 14, a dolly 16 of manganese peroxide depolarizer and a cathode in the form of a carbon rod 18.

The open end of the zinc can 12 is sealed by a bung seal 19 of plasticized polyvinyl chloride (PVC) and is enclosed within a rigid PVC tube 20 from which the can is separated by a paper tube 22. The tube 20 is crimped over the base of the zinc can 12 which is thickened to form the negative terminal and at the other end, over a nickel-plated steel cap 24 which is thus forced into contact with the end of the carbon rod 18 to serve both as a second seal and the positive terminal. The closed base of the separator tube 14 rests on a plastic disc 15. Lest the cap 24 should contact the end of the zinc can 12 where it is crimped over the bung seal 19 there is a plastic washer 26 between them. There is a ring 28 of polystyrene between the open end of the separator tube 14 and the can 12.

This cell can be assembled, with the aid of conventional Leclanché cell making equipment, as follows:

The zinc can 12 is amalgamated, the plastic disc 15 is inserted and the polystyrene ring 28 is pressed into the can 12 to the prescribed position for the upper edge of the anode 10.

The correct quantity of anode paste, made up of amalgamated zinc granules, gelling agent and water or aqueous potassium hydroxide, is dispensed into the bottom of the can 12 and an accurately located mandrel carrying a separator 14 in the form of a tubular cup of suitably strong absorbent paper with carefully sealed base, is pushed into the anode paste in the can 12. The paste is thus extruded up the wall of the can to the level of the ring 28 the main function of which is to ensure an even top to the anode without risk of spillage over the top of the separator tube 14. The mandrel is then withdrawn leaving the tube 14 in position.

An appropriate volume of electrolyte is added and a dolly of $MnO_2$, carbon black and graphite wetted with water or aqueous KOH, on the carbon rod cathode 18 is immediately pushed home within the tube 14. In a few minutes the swelling of the paper tube results in a firm assembly. The bung seal 19 is applied.

The cell is then wrapped in a suitable absorbent paper and pressed into the PVC tube 20 carrying the cap 24 and the washer 26, and the base of the tube 20 is swaged over.

The porosity of the carbon rod 18 is adequate to permit any excess of gas within the can 12 to escape past the bung seal 19 and the cap 24 serves as a second seal to retain any trace of electrolyte which may escape in the same way past the first seal.

The extrusion technique described is applicable to the manufacture of any electric cell having an annular anode of paste within a cylindrical can, for example in cells with zinc anodes and using mercuric oxide or silver oxide as depolarizers instead of or admixed with the manganese peroxide quoted above.

In place of the extruded paste anode described above it is possible to use other anode constructions in which an extended zinc surface is presented. For example the annular anode may be in the form of the zinc coated bibulous material described and claimed in Patent No. 2,571,732.

I claim:
1. An alkaline electric cell of cylindrical shape comprising a container, a cathode in the container, a depolarizer around the cathode, a separator around the depolarizer, an electrolyte and an anode comprising loose amalgamated zinc granules arranged in the form of an annulus on an inside wall of the container and immobilized by swelling of said separator, said granules prior to immobilization are suspended in a viscous fluid comprising an aqueous solution of a gelling agent, the whole mixture being of the consistency of a paste.

2. An alkaline electric cell of cylindrical shape comprising a container, a cathode in the container, a depolarizer around the cathode, a separator around the depolarizer, an electrolyte and an anode comprising loose amalgamated zinc granules arranged in the form of an annulus on an inside wall of the container and immobilized by swelling of said separator, said granules prior to immobilization are suspended in a a viscous fluid comprising an aqueous solution of a gelling agent, the whole mixture being of the consistency of a paste, and said paste having an easy-flow moldable property so when a measured portion of said paste is dispensed at the bottom of the container of the cell and when a separator in the form of a cup carried on a punch is forced into said portion of the paste the latter will flow up the wall of the container.

3. An alkaline electric cell of cylindrical shape comprising a container, a cathode in the container, a depolarizer around the cathode, a separator around the depolarizer, an electrolyte and an anode comprising loose amalgamated zinc granules arranged in the form of an annulus on an inside wall of the container and immobilized by swelling of said separator, a ring of insulating material fixed near the opening of the container of the cell in a controlled position dimensionally related to the height of the anode so as to provide a guide for the separator cup carried on the punch in such way that the paste flowing up the wall of the container is uniformly distributed around the separator, and the height of flow is limited by the position of said ring.

4. An alkaline electric cell of cylindrical shape comprising a container in which in concentric configuration there is contained a cathode, a depolarizer, a separator and an anode comprising loose amalgamated zinc granules arranged in the form of annulus on the inside wall of the container and immobilized by swelling of said separator, and an aqueous alkali electrolyte in the cell container, said depolarizer being manganese peroxide.

5. An alkaline electric cell according to claim 2, in which the container is composed of zinc.

6. An alkaline electric cell of cylindrical shape comprising a container in which in concentric configuration there is contained a cathode, a depolarizer, a separator and an anode comprising loose amalgamated zinc granules arranged in the form of annulus on the inside wall of the container and immobilized by swelling of said separator, and an aqueous alkali electrolyte in the cell container, said container being sealed in leakproof manner and provided with a vent which is permeable to gas but secured against leakage of electrolyte.

7. An alkaline electric cell of cylindrical shape comprising a container in which in concentric configuration there is contained a cathode, a depolarizer, a separator and an anode comprising loose amalgamated zinc granules arranged in the form of annulus on the inside wall of the container and immobilized by swelling of said separator, and an aqueous alkali electrolyte in the cell container, said container being sealed in leakproof manner and provided with a vent which is permeable to gas but secured against leakage of electrolyte, the container being sealed at the top by means of resilient insulating plastics molded prior to insertion in the form of a bung, tightly fitting the opening of the container and around the cathode which is of porous carbon and in the form of a rod, and a second vented seal in the form of a rigid plastic sleeve surrounding the container of the cell and sealed in liquid and gas in a tight manner to the edge of the metal top cap, the other end of said sleeve being turned under the bottom of the container of the cell to retain the sleeve on the cell and serve as outlet for the vented gas, and a wrapping between the container of the cell and the plastic sleeve of an absorbent paper in the form of a tube which is able to imbibe any electrolyte passing the first vent of the cell and the said porous carbon rod.

References Cited by the Examiner

UNITED STATES PATENTS

| | | | |
|---|---|---|---|
| 680,848 | 8/1901 | Erny | 136—126 |
| 1,174,798 | 3/1916 | Apple | 136—114 |
| 2,307,627 | 1/1943 | Lawson | 136—107 |
| 2,480,839 | 9/1949 | Daniel | 136—107 |
| 2,571,732 | 10/1951 | Lewis et al. | 136—107 |
| 3,075,870 | 1/1963 | Hedler et al. | 264—262 |

WINSTON A. DOUGLAS, *Primary Examiner.*

ALLEN B. CURTIS, A. SKAPARS, *Assistant Examiners.*